United States Patent Office 3,518,399
Patented June 30, 1970

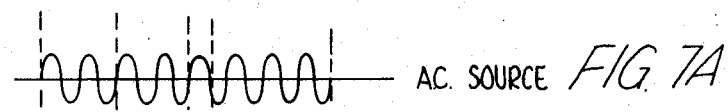
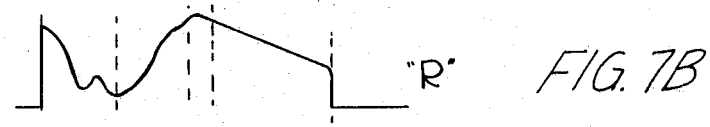
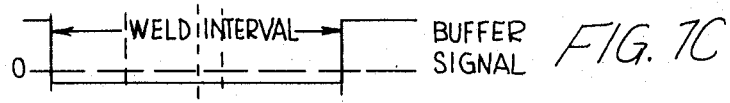
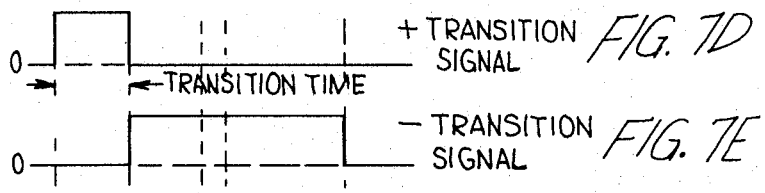
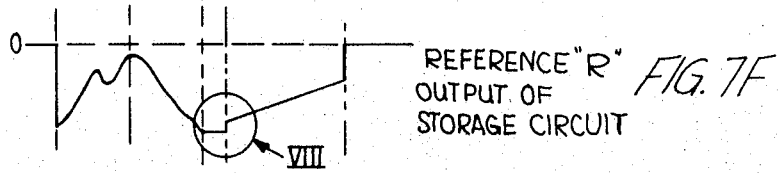
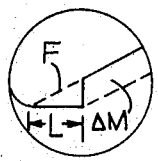
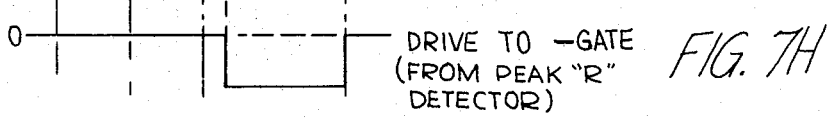
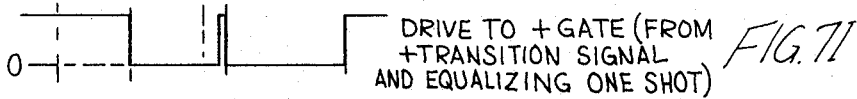
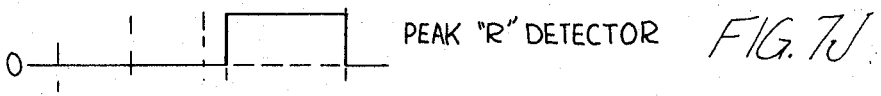
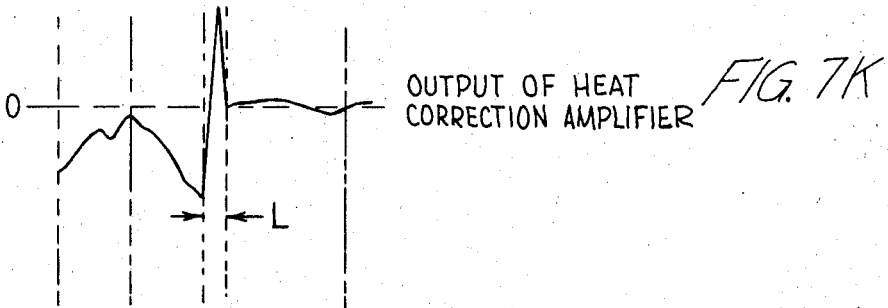

---

3,518,399
RESISTANCE DROP FEEDBACK WELD CONTROL
Peter W. Vanderhelst, Livonia, Mich., assignor to Robotron Corporation, Detroit, Mich., a corporation of Michigan
Filed July 3, 1967, Ser. No. 650,964
Int. Cl. B23k *11/16, 11/24*
U.S. Cl. 219—110          9 Claims

ABSTRACT OF THE DISCLOSURE

A resistance drop welding control circuit includes apparatus operable in conjunction with the weld timer of a resistance welding machine for terminating the weld interval after the weld contact resistance has dropped to a preset fraction of its peak value. Further apparatus is provided which constrains the weld contact resistance to follow a predetermined decreasing function during fusion. The constraining apparatus includes an operational amplifier fed with a resistance signal proportional to the weld contact resistance. A first negative feedback loop around the amplifier includes a storage circuit and a gate circuit energized during the initial portion of the weld interval to update the storage circuit from the output of the amplifier. Conduction of the gate closes the first feedback loop and limits the gain of the amplifier to a preselected level. After the initial unstable resistance portion of the weld interval has passed, means render the gate circuit unidirectionally conductive and prevent a change in amplifier output corresponding to the drop in contact resistance at the start of fusion from being applied as negative feedback to the amplifier input, the gain of the amplifier increasing in response to such a drop. A detector responds to a preset increase in gain and momentarily renders the gate fully conductive to update the storage circuit and return the storage signal and resistance signal to equivalence. The detector then turns off the gate and turns on a heat correction gate completing a second negative feedback loop around the amplifier to thereafter limit its gain. A discharge circuit energized by the detector gradually drains the storage circuit in accordance with a preselected function which the contact resistance is to follow so that the amplifier is driven when the resistance signal deviates from the stored signal as the latter follows the desired function. A heat control amplifier driven by the sum of the output of the heat correction gate and a heat control reference signal regulates the weld heat to cause the weld contact resistance to decrease during fusion in accordance with the preselected function.

CROSS REFERENCES TO RELATED APPLICATIONS (1) Application Ser. No. 650,714, filed July 3, 1967.
(2) Application Ser. No. 650,789, filed July 3, 1967.

FIELD OF THE INVENTION

This invention relates to a resistance drop feedback welding control and more particularly, relates to a method and apparatus for detecting the occurrence of the peak point of the weld contact resistance and for causing said contact resistance to follow without initial error a predetermined decreasing function thereafter.

DISCUSSION OF THE PRIOR ART

It has been known for some time that for example in the welding of plain uncoated mild steel, there is a discernible change in the electrical resistance between the welding electrodes during the course of the weld. For the first several cycles of weld time the resistance is generally unstable as the result of material surface conditions or metal fit-up problems. However, the resistance thereafter gradually rises to a peak value indicating the beginning of fusion and thereafter gradually drops as fusion continues. There is evidence that the amount of resistance drop is related to nugget size.

Several controls are known which do nothing more than watch resistance under constant current conditions and terminate weld time when the desired resistance drop has occurred. As the sole control, this may cause varying weld times. This may not be acceptable on a gun welding job or even on a high-speed press operation.

An improvement on this was disclosed by Pat. No. 2,848,595 to Van Sciver, now assigned to the assignee of the present invention. In that system, the contact resistance at the weld position is constrained to follow a predetermined function during weld nugget formation. This function is experimentally determined prior to welding and is programmed into the welding machine. The Van Sciver machine generates a function signal related to the above-mentioned predetermined function, compares the function signal to a signal related to the contact resistance, determines the error between them and then varies the heat input to the workpiece to correct such error.

However, the Van Sciver device has a number of operational disadvantages which it is the purpose of the present application and of copending applications Ser. No. 650,714 and No. 650,789 to cure.

The Van Sciver device is sharply limited in its use due to the types of components and circuitry used therein. It has been found that a device built according to the Van Sciver patent required the services of an engineer with an oscilloscope to set it up and it was necessary to repeat the set up every day due to tube drift and various other instabilities in the circuitry.

Van Sciver further fails to recognize that the occurrence of the resistance peak indicating the beginning of fusion is relatively gradual, often taking place over a matter of several cycles and being succeeded by a relatively gradual drop in resistance. Furthermore, during the time period preceding the peak marking the beginning of fusion, there may be electrical noise or transient irregularities in the resistance which the control should not interpret as the resistance peak. Thus, determination of the peak will require a finite amount of time, perhaps several cycles until it is apparent that the resistance peak has actually taken place. However, by this time the actual weld resistance will have necessarily fallen from its peak value and any reference function based on the peak resistance magnitude would then be elevated above the path of the actual resistance. The Van Sciver system would see this difference as an error in the contact resistance and would correct for it by decreasing the weld heat in an attempt to slow the drop of the contact resistance. The effect, therefore, of this initial error is to cause rather than prevent the deviation of weld resistance from its intended decreasing function and to erroneously decrease the amount of weld current during the initial portion of the weld which may affect the weld quality.

In addition, where the weld heat is constrained more or less closely to follow a preselected function, I have found that although for some usages it is satisfactory to terminate the weld heat upon conclusion of a preselected amount of time, such may result in differences in nugget size from weld to weld as a result of variations in the peak resistance time, variations in the peak resistance amplitude and deviations of contact resistance from the desired resistance drop function. Thus, I contemplate using a device for terminating weld current after a predetermined fractional drop in contact resistance from its peak value, as well as limiting the maximum allowed weld interval, in association with a control for maintaining the resistance drop along a preselected diminishing function to better control the condition of the finished weld while maintaining control over fusion time.

Accordingly, it is an object of this invention to provide a feedback resistance drop welding control including improved method and apparatus for causing the contact resistance to follow a predetermined decreasing function during fusion.

A further object is to provide a method and apparatus, as aforesaid, which allows a finite amount of time for detection of the resistance peak.

A further object is to provide a method and apparatus, as aforesaid, which shifts the reference function, after the peak resistance has been detected, to coincide with the contact resistance which has dropped from its peak value during the peak detecting process.

A further object is to provide a method and apparatus, as aforesaid, which avoids an initial error between the values of the contact welding resistance and the desired function and thereby avoids spurious reduction in the weld heat which increases the time required for a satisfactory weld.

A further object is to provide an apparatus, as aforesaid, capable of providing a relatively large peak indicating signal in response to a relatively small resistance drop from peak.

A further object is to provide an apparatus, as aforesaid, which effectively ignores variations in resistance during initial unstable resistance portion of the weld interval.

A further object of this invention is to provide an apparatus, as aforesaid, which is self-stabilizing and highly stable in the face of variations in operating conditions.

A further object of this invention is to provide an apparatus, as aforesaid, in which the weld heat though normally set at the desired value is adjustable for increasing or decreasing the rate of drop of the weld contact resistance during fusion.

A further object is to provide an apparatus, as aforesaid, in which an alternative, closed looped control may be maintained over the weld heat to compensate for variations in the electrode voltage in addition to the closed control for variations in the rate of drop of the weld contact resistance from its desired function.

A further object is to provide an apparatus, as aforesaid, particularly adapted to receive timing signals from and have weld termination controlled by apparatus adapted to terminate weld heat in response to a preselected fractional drop of the contact resistance from the peak value thereof.

A further object is to provide an apparatus, as aforesaid, which will operate for long periods without adjustment, which can be readily and inexpensively manufactured from standard components, which can be compactly packaged, which is adaptable to use in a variety of welding machines and which is capable of a long and trouble free service life with little or no maintenance.

Other objects and purposes of this invention will be apparent to persons acquainted with apparatus of this general type upon reading the following description and examining the accompanying drawings.

BRIEF DESCRIPTION OF THE DRAWINGS

FIGS. 7A–7K are diagrams disclosing various waveforms found in the circuit of FIG. 1.

FIG. 8 is an enlarged portion of the waveform diagram of FIG. 7F illustrating the initial drop of contact resistance.

SUMMARY OF THE INVENTION

In general, the objects and purposes of this invention have been met by providing a resistance drop feedback welding control which compares the weld contact resistance with a preselected resistance function, after initially matching the function to the contact resistance, and controls welding heat to thereafter minimize the difference therebetween. An operational amplifier is fed with a resistance signal proportional to the weld contact resistance. A first negative feedback loop, including a storage circuit connected to the amplifier input and a gate normally connecting the storage circuit to the output of the amplifier, is provided around the amplifier and when closed limits the gain of the amplifier. After the initial, unstable resistance portion of the weld interval has passed, the gate circuit is limited to unidirectional conduction and is incapable of updating the storage circuit in response to the drop in contact resistance occurring after fusion starts, the amplifier gain increasing as the resistance drops gradually. A detector responds to a preset gain increase and causes the gate to momentarily equalize the storage circuit to the new lower value of the resistance signal whereafter the gate falls nonconductive, breaking the first loop. A heat correction gate is rendered conductive by the detector and completes a second feedback loop around the amplifier as the first feedback loop is broken by shutting of the first-mentioned gate. A discharge circuit is energized by the detector for draining the storage circuit in accordance with a preselected decreasing function so that the feedback signal follows this function so that the storage circuit provides the amplifier input with a signal following such desired function. A heat control amplifier driven by the sum of the output of the heat correction gate and a heat control reference signal regulates the welding heat to cause the contact resistance to follow the preselected function. Termination of the weld heat after a preselected fractional resistance drop is also contemplated.

DETAILED DESCRIPTION

Figure 1:
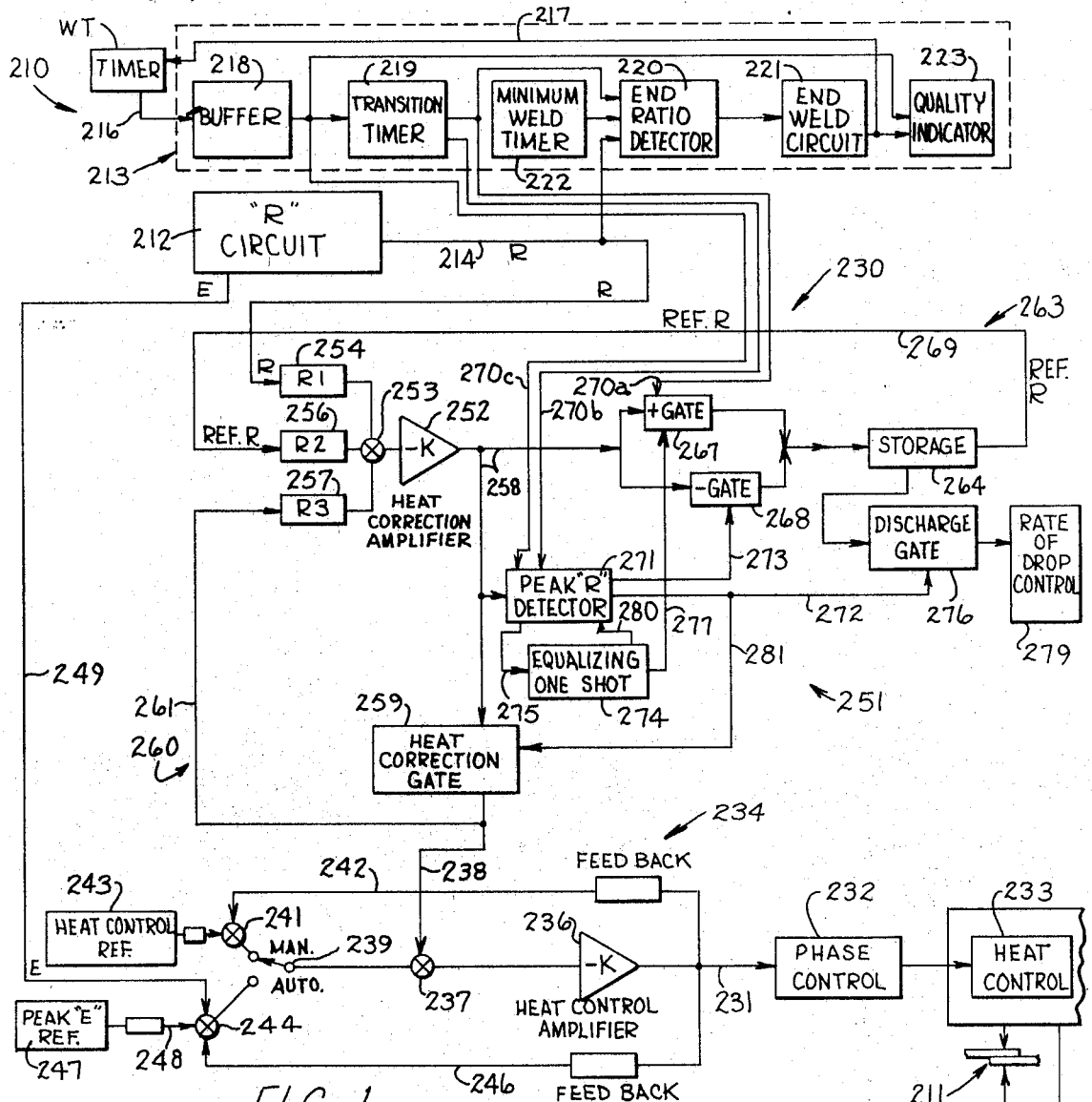
FIG. 1 is a block diagram of a heat correction control circuit embodying the present invention.

FIG. 1 discloses a feedback resistance drop welding control 210 embodying the invention. The control 210 is intended for use with a resistance welding machine 211 of any conventional type including any convenient weld timer WT.

The control 210 includes a generator 212 for providing a resistance signal R proportional to the instantaneous contact resistance at the welding position preferably of the type disclosed in copending application Ser. No. 650,714 assigned to the assignee of the present invention.

The control 210 further includes an end weld control circuit 213 which detects a drop in the weld contact resistance to a preselected fraction of its peak value, such peaking of the contact resistance denoting the beginning of fusion and the fall to said preselected fraction indicating the completion of a satisfactory weld. The end weld control 213 is provided with the contact resistance signal R through a line 214 and a signal from the weld timer WT through a line 216 for the duration of the weld interval. When the weld contact resistance has fallen to the preselected fraction of its peak value, the end weld control 213 provides an output on a line 217 to the weld timer WT to cause same to then terminate the weld interval and reset for the next interval to be timed.

The system 210 embodying the invention further includes a heat correction control circuit 230 intended to constrant the contact resistance, as it falls during fusion, to follow a predetermined diminishing function. The heat correction control 230 requires several input signals in addition to the afore-mentioned resistance signal R. More particularly, the present embodiment of the heat correction control 230 requires a signal (FIG. 7C) indicating the beginning and end of the weld interval and further signals (FIGS. 7D and 7E) defining the end of an initial portion of the weld interval during which the contact resistance is likely to be erratic due to varying metal surface conditions and so forth.

Thus, although these signals can be otherwise obtained, it is apparent that an end weld control 213 of the kind disclosed in copending application Ser. No. 650,789 assigned to the assignee of the present invention, which generates the afore-mentioned signals affords a convenient and economical source thereof.

The end weld control 213 of the afore-mentioned application Ser. No. 650,789 can be briefly described as including a buffer circuit 218 energized for the length of weld interval through line 216 by a conventional weld timer WT for providing the desired negative going buffer signal of FIG. 7C to a line 270c as well as to a transition timer 219. The transition timer 219 may be of any convenient type capable of providing the plus transition signal from FIG. 7G of FIG. 7D to line 270b during the initial, transition time portion of the weld interval and of similarly providing in the remaining portion of the weld interval the negative transition signal of FIG. 7E to line 270a, both transition signals being positive D.C. potentials.

The end weld control of the afore-mentioned application Ser. No. 650,789 includes an end ratio detector 220 provided with the resistance signal R from line 214 and the negative transition signal from the line 270a for determining when the R signal has fallen to a predetermined fraction of its peak value whereupon the end ratio detector, by means of an end weld circuit 221, causes the timer WT to end the weld interval if it has not already timed out and done so. A minimum weld timer 222 prevents an output from the end ratio detector until minimum time required for a satisfactory weld has passed. A quality indicator 223 indicates whether the desired resistance drop has taken place before the weld timer times out.

Turning now to the heat correction control circuit 230, such, as stated, controls the rate at which the contact resistance falls from its peak value during fusion and more particularly constrains the contact resistance to closely follow a preselected resistance function during fusion. The heat correction control 230 does so by controlling the welding current input to the workpiece and hence the welding heat. To this end the heat correction control 230 drives through a line 231, a phase control circuit 232 and therethrough a heat control circuit 233 of any conventional type associated with the welding machine 211.

The output portion 234 of the heat correction control 230 includes a phase inverting operational amplifier 236, hereinafter referred to as the heat control amplifier, the output of which is coupled to the aforementioned line 231. The heat control amplifier 236 is driven from a summing junction 237 to which the output line 238 of the heat correction portion 251 of the heat correction control 230 may apply a heat correction signal during fusion. As hereinafter discussed, the heat correction signal is proportional to the deviation of the actual contact resistance during fusion from a desired decreasing function which it is intended to follow. A heat control reference generator 243 provides an adjustable reference voltage for setting the level of heat normally to be applied by the welding machine 211 to the workpiece. In a conventional welding machine, a device such as the heat control reference generator 243 would normally have its output directly coupled to the phase control 232 for setting the welding heat. However, in the particular embodiment shown, the output heat reference signal from the generator 243 is summed with the heat correction signal, if any, from line 238 and applied to the input of the heat control amplifier 236. In addition, a negative feedback signal, comprising the output of the inverting amplifier 236, is applied through line 242 to the input of said amplifier. This negative feedback stabilizes the gain of the heat control amplier 236 at a preselected value preferably unity. More particularly, the heat reference signal from the generator 243 is applied with the negative feedback on line 242 through a summing junction 241 and a switch 239, when such switch is in its manual position, to the summing junction 237 at the amplifier input to which the heat correction signal line 238 connects.

The switch 239 is provided with a second position, termed the automatic position, in which it connects the input to the heat control amplifier 236 with a further summing junction 244. The switch 239, when in the manual position provides only open loop control of the weld heat by the heat control reference 243. The switch 239 in its optional automatic position provides closed loop control of the heat of the electrode voltage to prevent changes in electrode voltage which if uncorrected would result in changes in weld heat. The summing junction 244 has three inputs. More particularly a negative feedback signal is applied from the output of amplifier 236 to the summing junction 244 through a negative feedback line 246 to control the otherwise extreme gain of the amplifier 236. Further, a peak E reference signal generator 247 is coupled through a line 248 to the summing junction 244. The peak E reference generator may be of any convenient type capable of producing a preselected signal of magnitude proportional to the desired level of the electrode voltage during the weld interval. Finally, a signal termed the peak E signal which is proportional to the actual electrode voltage is supplied through a line 249 to the summing junction 244. The peak E signal may be supplied by any convenient source, but in the particular embodiment shown, the line 249 is coupled to the R generator circuit 212 which preferably is that disclosed in the aforementioned copending application Ser. No. 650,714 and which is capable of providing a peak E signal by sampling the welding electrode voltage amplitude at the peak points of succeeding welding current half waves. The peak E signal is positive in the particular embodiment shown while the peak E reference signal is negative and of sufficient magnitude that the sum thereof will normally be negative. As a result, a magnitude increase in peak E, which would increase weld current, results in a magnitude decrease in the sum thereby having the effect of diminishing the peak E reference signal. This sum is added to the heat correction signal, if any, from line 238 at the input to the heat control amplifier 236. The amplifier output is applied to the phase control 232 for varying the weld current to compensate for spurious electrode voltage changes and the effects thereof on the weld current.

The remaining discussion will consider, for simplicity of illustration, that the circuit 230 is operating in its manual mode rather than its automatic mode.

The attention is now directed to the heat correction portion 251 of the heat correction control 230 which portion is concerned with sensing deviations of the dropping contact resistance during fusion from a preselected decreasing resistance function. The heat correction portion 251 includes a high gain, phase inverting operational amplifier, hereinafter termed the heat correction amplifier 252. The heat correction amplifier 252 receives inputs from a summing junction 253. The resistance signal R provided by line 214 from the R generator 212, and two feedback signals hereinafter discussed, provided through feedback loops 260 and 263 to limit the gain of the amplifier, are applied to the summing junction 253 through summing resistors 254, 256 and 257, respectively.

The heat correction amplifier 252 provides an output on a line 258 to a heat correction gate 259 which when conductive drives the output line 238 hereinabove described. When operative, the heat correction gate 259 closes the feedback loop 261. Thus, the output of the heat correction gate 259 is fed back through a line 261 and the afore-mentioned summing resistor 257 to the input of the heat correction amplifier 252 to limit the normally extreme gain of the heat correction amplifier.

The other feedback loop 263 comprises a storage circuit 264 connectible by parallel gate circuits 267 and 268, hereinafter termed the plus gate and minus gate, respectively, to the output of the amplifier 252 and through a line 269 and the summing resistor 256 to the input of said amplifier. The plus gate is normally in a conductive state though appearance of the minus transition signal on the line 270a will render said gate nonconductive. The plus gate will pass only a positive going signal. Since the heat correction amplifier 252 is an inverting amplifier, the plus gate would be energizable to conduct a decreasing amplifier input, e.g., a decreasing resistance signal R. On the other hand, the negative gate 268 is energizable to pass only negative going signals applied thereto and hence increasing amplifier inputs.

The storage circuit 264 stores the latest signals applied thereto by the gates 267 and 268 and is continually updated by such gates when they conduct. When both gates 267 and 268 are operative, the storage output, reference R, on line 269 is equal to the output of the amplifier 252. Thus, since the gain of the operational amplifier 252 is very high, current flow to its input is negligible and all current flow through the junction 253 can be considered to be through the summing resistors 254 and 256; if these resistors are equal, their voltage drops will be equal. Thus, the resistance signal R and reference R signal, causing such drops can be and preferably are so made equal in magnitude.

The heat correction portion 251 of the circuit embodying the invention further includes a peak R detector circuit 271. The peak R detector is normally in its rest state except as hereinafter described and when in such rest state provides drive to the minus gate 268 through a line 273. The peak R detector 271 has an input from the output line 258 of the heat correction amplifier 252 which is normally insufficient to shift the peak R detector from its rest state. However, a large increase in signal level on the line 258 will energize the peak R detector causing same in turn to drive an equalizing one-shot multivibrator circuit 274 through a line 275 and thereafter shift from its rest state. The equalizing one shot 274, when energized, momentarily drives the plus gate 267 conductive through a line 277.

A discharge gate 276 is interposed between the storage circuit 264 and a rate drop control 279. The discharge gate is driven conductive through line 272 by the peak R detector 271 when the latter shifts from its rest to its energized state. The rate of drop control is manually adjustable to lower the resistance value stored in the storage circuit 264 at a predetermined rate when the discharge gate is rendered conductive by the peak R detector. Further, the output line 272 of the peak R detector connects through a further line 281 to the heat correction gate 259 to render same conductive when the peak R detector 271 shifts from its rest state.

Figure 2:
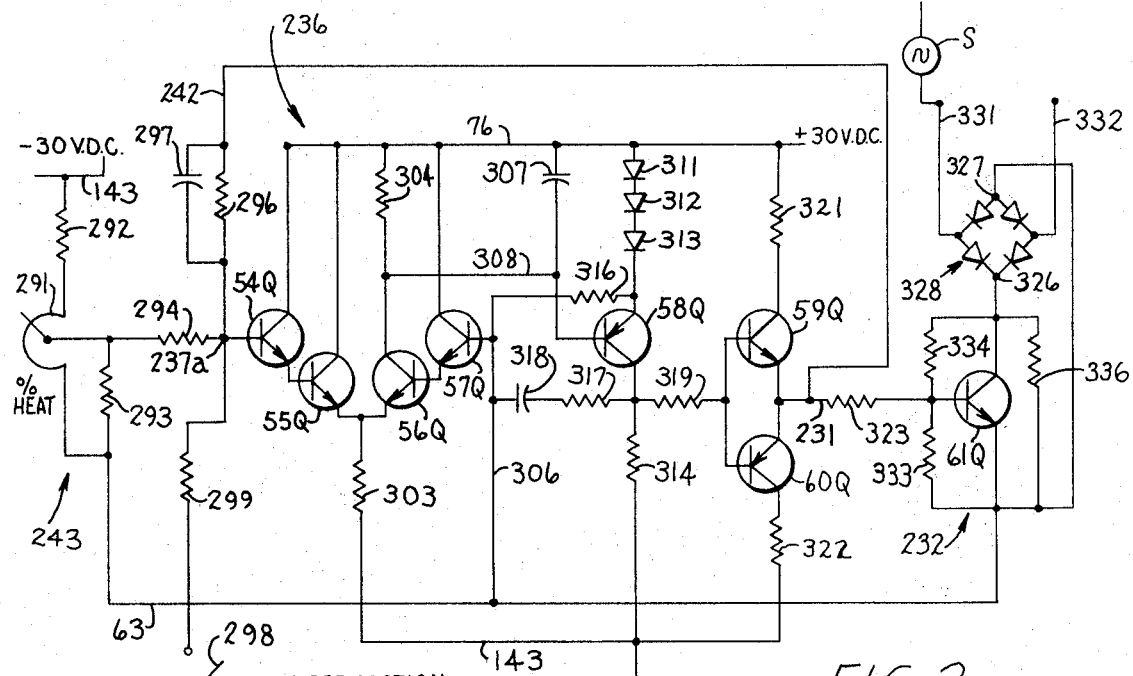
FIG. 2 is a schematic diagram illustrating the heat control amplifier utilized in the circuit of FIG. 1.

Turning now to the detailed circuitry of the heat correction control 230 embodying the present invention, FIG. 2 discloses a preferred embodiment of the output portion 234 thereof and a preferred phase control 232. For simplifying the drawing, the circuitry of FIG. 2 omits the switch 239 and the circuitry of FIG. 1 associated with its automatic contact, the omitted portions not being essential to the present invention. The heat control reference source 243 comprises a manually adjustable potentiometer 291 connected to a common potential line 63 and through a series resistor 292 to a negative potential line 143, here held at negative 30 volts D.C. The setting of the wiper of the potentiometer 291 determines the percentage weld heat desired and the reference heat signal on the wiper is applied through a resistor 293 which connects the wiper to the common line 63. The heat control referenence signal appearing on the wiper of the potentiometer 291 is applied through a summing resistor 294 to the summing junction 237a corresponding to the summing junction 237 in FIG. 1. The feedback line 242 around the heat control amplifier 236 includes a parallel resistance 296 and capacitor 297 connected to the summing junction 237a. Finally, the line 238 from the heat correction gate 259 of FIG. 1 connects through a summing resistor 299 to the summing junction 237a. If desired, a manually operable on-off switch 298 may be interposed in line 238 to allow the welder to operate with feedback control of the contact resistance.

The heat control amplifier 236 is a D.C. coupled operational amplifier comprising transistors 54Q, 55Q, 56Q, 57Q, 58Q, 59Q and 60Q. The transistors 54Q and 55Q are connected in cascade as a Darlington pair for buffering the sum signal appearing at the junction 237a. More articularly, the collectors of transistors 54Q and 55Q connect directly to a positive potential line 76 held at any convenient positive D.C. potential, here 30 volts. The sum signal appearing on junction point 237a drives the base of transistor 54Q. The emitter of transistor 54Q connects directly to the base of transistor 55Q and the emitter of the latter is connected through a dropping resistor 303 to the negative potential line 143. The sum potential appearing at junction point 237a is thus reproduced at the emitter of transistor 55Q.

The transistors 56Q and 57Q are also connected as a cascaded pair, the transistor 57Q regulating the current drive to the transistor 56Q and the transistor 56Q reproducing the buffered sum signal, but at a higher potential, on its collector. More particularly, the collector of transistor 56Q connects through a dropping resistor 304 to the positive potential line 76 and the collector of transistor 57Q connects directly to said positive potential line. The base drive of the transistor 57Q is supplied from the common line 63 through a conductor 306. The emitter of transistor 57Q directly drives the base of transistor 56Q. The emitter of transistor 56Q connects directly to the emitter of transistor 55Q of the Darlington pair and hence rises and falls therewith. As a result, a rising sum potential at junction point 237a results in a rising potential on the emitter of transistor 56Q thus lessening conduction therethrough and driving the collector thereof in the positive direction. Similarly, a drop in potential at the input to the operational amplifier would result in a drop in collector potential for transistor 56Q. A capacitor 307 parallels the dropping resistor 304 and clamps out unwanted transient potentials appearing at the collector of transistor 56Q.

The signal on the collector of transistor 56Q is impressed by a line 308 onto the base of an amplifier transistor 58Q of polarity opposite that of transistors 54Q through 57Q and which is thus a PNP device. Emitter current is supplied to the amplifier transistor 58Q through a series of diodes, here three in number and indicated at 311, 312 and 313, from the positive potential line 76. A dropping resistor 314 connects the collector of transistor 58Q to the negative potential line 143. A resistor 316 connects the emitter and the series diodes 311, 312 and 313 to the common line 63 to maintain same conductive. This maintains the emitter of transistor 58Q at a fixed potential below that of the positive potential line 76. A series resistor 317 and capacitor 318 connect the collector of transistor 58Q to the common line 63, here through the conductor 306, for clamping out transients appearing at said collector. The amplified and phase inverted output of the amplifier transistor 58Q is taken from the collector thereof and coupled through a resistor 319 to the bases of transistors 59Q and 60Q which are connected in a complementary symmetry array. Transistors 59Q and 60Q are of opposite polarity, transistor 60Q being a PNP type. The emitters of transistors 59Q and 60Q are directly connected and the collectors thereof are coupled through dropping resistors 321 and 322, respectively, to the positive potential line 76 and negative potential line 143. The output of the amplifier 236 which is taken from the emitters of the pair 59Q, 60Q, is applied to the negative feedback line 242 and through a coupling resistor 323 to the input of the phase control 232.

Although it is contemplated that the present invention may be extended to phase controls of differing types, the phase control 232 here disclosed is a preferred embodiment. The phase control 232 includes a transistor 61Q, the emitter and collector terminals of which connect to the inputs 326 and 327 of a bridge rectifier 328. The bridge rectifier has output lines 331 and 332. The diodes of the bridge rectifier 328 are oriented with cathodes toward the collector of transistors 61Q and anodes toward the emitter thereof to allow current flow from an A.C. source S through the diodes and transistor. The base of transistor 61Q is coupled to the emitter and collector thereof through resistors 333 and 334 and said emitter and collector are directly coupled by a further resistor 336. Said emitter also connects to the common line 63.

Conventional phase shift heat controls often use a potentiometer in series with an A.C. circuit so that adjustment determines the heat to be applied to the workpiece. In the particular embodiment shown, such a potentiometer is omitted and in its place are connected the bridge rectifier output lines 331 and 332. The bridge rectifier 328 acts as a resistance variable in proportion to conduction through transistor 61Q. The positive output of the operational amplifier 236 drives the base of the transistor 61Q causing conduction therethrough of alternating current applied to lines 331 and 332 at a level directly related to the amplifier output.

Figure 3:
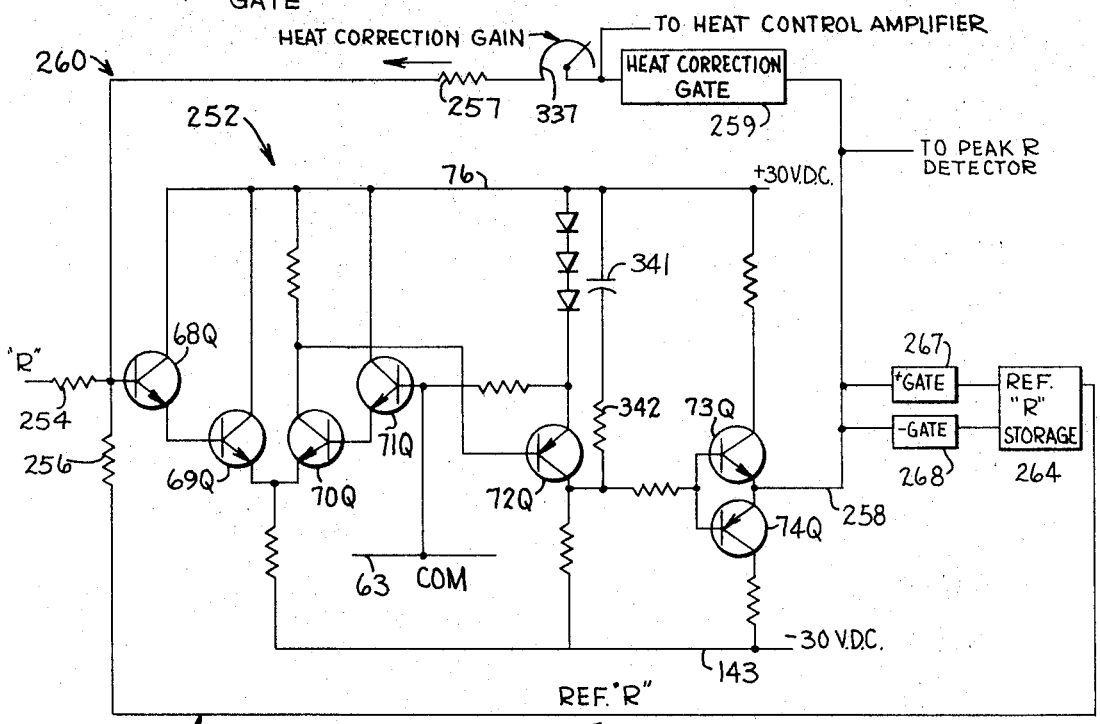
FIG. 3 is a schematic diagram disclosing the heat correction amplifier utilized in the circuit of FIG. 1.

FIG. 3 discloses the heat correction amplifier 252 together with its associated feedback loops 260 and 263 discussed above with respect to FIG. 1. In the particular embodiment shown, a heat correction gain potentiometer 337 is placed in series with the output of the heat correction gate 259 and the summing resistor 257 for setting the gain of the amplifier 252 when the heat correction gate is conductive. The heat correction amplifier 252 is essentially similar to the heat control amplifier 236 above described with respect to FIG. 2. Hence, a detailed description of the amplifier 252 is not believed required. The amplifier 252 comprises transistors 68Q, 69Q, 70Q, 71Q, 72Q, 73Q and 74Q corresponding to transistors 54Q through 60Q, respectively, of the amplifier 236. Other parts of the amplifier 252 corresponding to parts in the amplifier 236 will be referred to by the same reference numerals with the suffix *a* added thereto. The amplifier 252 does, however, differ in several respects from the amplifier 236. More particularly, the resistor 317 and capacitors 307 and 318 of the amplifier 236 are omitted in the heat correction amplifier 252. Instead, the amplifier 252 is provided with a series capacitor 341 and resistor 342 disposed between the positive potential line 76 and the emitter of transistor 72Q.

As discussed above with respect to FIG. 1, the output is taken from the heat correction amplifier 252 and applied through line 258 to the plus gate 267 and minus gate 268. The plus gate 267 (FIG. 4) includes a gating transistor 76Q and an actuating transistor 80Q. The collector and emitter of the transistor 76Q connect in series between the output line 258 of the heat correction amplifier and the input 346 of the reference R storage circuit 264. A protective diode 347 is connected in series with the transistor 76Q to prevent reverse conduction therethrough by having its cathode connected to the transistor collector. Base bias is provided transistor 76Q by a resistor 348 connecting the base and emitter terminals thereof.

The plus gate transistor 76Q is provided with two inputs to the base thereof. More particularly, the equalizing signal line 277 connects to the base of transistor 76Q through a series resistor 351 and isolating diode 352. Further, the collector potential of the switch transistor 80Q is provided through a line 353, having a series resistor 354 and isolating diode 356 in series therein, to the base of gating transistor 76Q. The diodes 352 and 356 have their cathodes oriented toward the base of the transistor 76Q for impressing, when energized, positive potentials thereon. The transistor 76Q will conduct, opening the plus gate 267, whenever either the equalizing signal line 277 or the line 353 is positive with respect to the emitter of transistor 76Q.

The switch transistor 80Q, associated with the plus gate transistor 76Q, has its collector connected through a resistor 358 to the negative potential line 143 and its emitter connected intermediate the ends of the voltage divider comprising resistors 357 and 360 connected from the positive potential line 76 and the common line 63. The switch transistor 80Q is in the present embodiment a PNP transistor driven at its base through a resistor 359 from the conductor 270a which carries the minus transition signal from the end weld control 213 as above discussed. Thus, the transistor 80Q is normally conductive and is rendered nonconductive by the minus transition signal (which as seen in FIG. 7E is of positive polarity). When conductive, the collector of the transistor 80Q is held at a relatively high potential which is applied to the line 353 to render the plus gate 267 conductive.

The minus gate 268 comprises a transistor 75Q similar to the plus gate transistor 76Q. The emitter of the minus gate transistor 75Q connects to the output line 258 of the heat correction amplifier and the collector thereof connects through a protective diode 361 to the input point 346 of the storage circuit 264. The diode 361 prevents reverse conduction through the transistor 75Q. A resistor 362 biases the base of the transistor 75Q from the emitter thereof. The output line 273 (FIG. 1) from the peak R detector 271 connects through a series resistor 363 and isolating diode 364 to the base of the minus gate transistor 75Q. The minus gate transistor 75Q becomes conductive upon receiving a positive signal from the peak R detector and remains conductive as long as such positive signal is maintained.

The storage circuit 264 comprises a storage capacitor 367 connected between the input point 346 and the common line 63. The charge on the capacitor, placed thereon by conduction through one or both gates 267 and 268, is buffered out by a buffer circuit comprising cascade connected transistors 77Q, 78Q and 79Q and appears across a resistor 368 connecting the emitter of transistor 79Q to the negative potential line 143. More particularly, the collectors of transistors 77Q, 78Q and 79Q are connected to the positive potential line 76. The base of the first transistor 77Q is driven from the input point 346 by the potential appearing on the upper plate of capacitor 367. The bases of succeeding transistors 78Q and 79Q are driven from the emitters of the preceding transistors 77Q and 78Q, respectively. The output is taken from the emitter of transistor 79Q through the line 269 and is applied to the input of the heat correction amplifier as shown in FIG. 1.

The discharge gate 276 comprises an anode to anode connected pair of diodes 371 and 372. The cathode of the diode 371 connects to the peak R detector circuit through line 272 and the cathode of diode 372 connects through a line 373 to the input point 346 of the storage circuit 264. Both diodes have their anodes connected through a load resistor 374 in series with a rate of drop potentiometer 376 to the common potential line 63. A negative potential on the line 272 results in conduction through diode 371, resistor 374 and the rate of drop potentiometer 376 from the common line 63 which drops the potential of the anode of diode 372, thus blocking conduction therethrough. This prevents discharge of the storage capacitor 367. On the other hand, when conduction through the diode 371 is blocked by a high potential on line 272, the diode 372 will conduct any negative charge from the storage capacitor 367 through the resistor 374 and rate of drop control 376 to the common line 63.

The peak R detector circuit 271 and equalizing one-shot circuit 274 (FIG. 5) are closely associated, the one-shot circuit being located between the initial and final portions of the peak R detector. The peak R detector includes transistors 62Q, 66Q and 67Q. Considering the initial portion of the peak R detector 271, the output of the heat correction amplifier 252 is supplied from the line 258 through a resistor 357 to the emitter of the unijunction transistor 62Q and to a capacitor 378 connected between said emitter and the common line 63. The bases of the unijunction 62Q are connected through dropping resistors 379 and 381 to the positive potential line 76 and the common line 63, respectively. When the charge on the capacitor 378 rises sufficiently, the unijunction 62Q will conduct, discharging the capacitor 378 therethrough and providing a positive going potential on the lower base thereof.

Transistors 65Q and 81Q are connected in a one-shot multivibrator circuit referred to hereinabove as the equalizing one-shot circuit 274. More particularly, the emitters of transistors 65Q and 81Q directly connect to the negative potential line 143, the collectors thereof connect through respective dropping resistors 382 and 383 to the positive potential line 76 and base bias is applied thereto through respective resistors 384 and 386. The collector of transistor 65Q is coupled to the base of transistor 81Q by a resistor 387. The collector of the transistor 81Q is coupled to the base of transistor 65Q through a series resistor 388 and a capacitor 389. Input is provided to the one-shot circuit 274 through a series capacitor 391, resistor 392 and diode 393 coupling the lower base of the unijunction 62Q to the base of transistor 65Q. A further resistor 394 connects from between the anode of the diode 393 and resistor 392 to the negative potential line 143. The capacitor 391 couples a positive pulse to the base of transistor 65Q for rendering same conductive when the unijunction 62Q fires and the lower base thereof swings positive. The output of the equalizing one-shot circuit 274 is a positive equalization pulse (FIG. 7I) taken from the collector of transistor 81Q on the line 277 to the plus gate 267.

The remainder of the peak R detector 271 comprises a flip flop incorporating transistors 66Q and 67Q. More particularly, transistors 66Q and 67Q are connected at their emitters directly to the negative potential line 143, at their collectors through dropping resistors 396 and 397 to the positive potential line 76 and at their bases through bias resistors 398 and 399 to the negative potential line 143. The bases of the transistors 66Q and 67Q are coupled to the collectors of the others of said transistors through respective resistors 401 and 402.

The flip flop 66Q, 67Q is provided with several inputs. More particularly, the collector of transistor 65Q of the equalizing one-shot circuit is connected through line 280 and a coupling capacitor 403 and an isolating diode 404 in series therewith to the base of transistor 66Q. The capacitor 403 couples positive and negative pulses therethrough in response to a rise and fall, respectively, of collector potential on the transistor 65Q. The cathode of diode 404 connects to the base of transistor 66Q for impressing only the positive pulses thereon so as to cause said transistor to fire and the flip flop to shift from its rest state. A clamping diode 406 connects between the anode of diode 404 and the negative potential line 143 and is oriented with its anode toward the negative potential line for preventing the pulse amplitude coupled through capacitor 403 from falling beneath the amplitude of the negative potential on line 143.

In addition, the flip-flop transistor 67Q is provided with inputs from the buffer and plus transition lines 270c and 270b, respectively, of the end weld control 213. The buffer line 270c connects through a series resistor 407, coupling capacitor 408 and isolating diode 409 to the base of transistor 67Q. Similarly, the plus transition line 270b connects through a series capacitor 411, resistor 412 and isolating diode 413 to said base. In both cases, the diodes are oriented to impress positive going potentials on the base of transistors 67Q. Further resistors 416 and 417 couple the anodes of the diodes 409 and 413 to the negative potential line 143 for biasing same normally nonconductive. Thus, signals on the buffer and plus transition lines 270c and 270b must be of sufficient positive magnitude to overcome the reverse biasing thus applied to the diodes in order to render the transistor 67Q conductive. Transistor 67Q conducts on occurrence of suitable positive potential on either or both of the lines 270c and 270b.

The outputs are taken from the flip flop at the collectors of transistor 66Q and 67Q. More particularly, the line 273 driving the minus gate connects to the collector of transistor 66Q and is at a high when the transistor 66Q is nonconductive, i.e., when the peak R circuit is at rest. Further, the line 281 connects the collector of transistor 67Q to the heat correction gate 259 and through further line 272 to the discharge gate 276 for energizing same when the collector of the transistor 67Q is at high potential i.e., when the peak R detector is no longer at rest.

Figure 6:
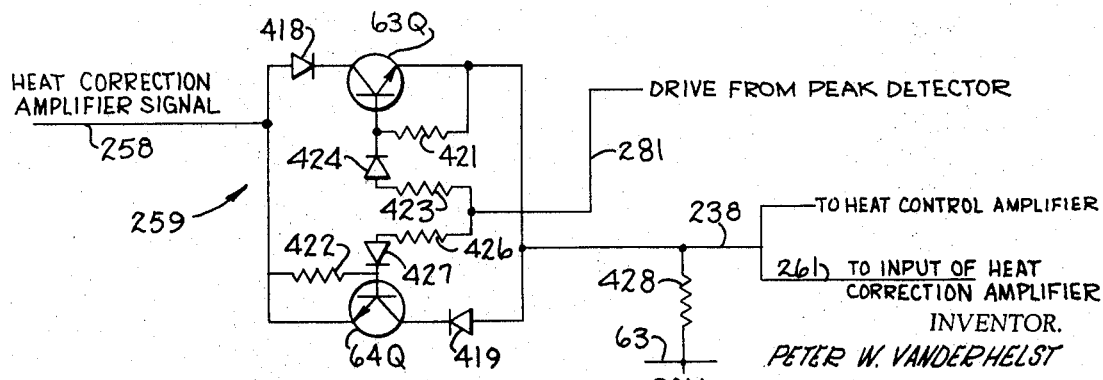
FIG. 6 is a schematic diagram disclosing the heat correction gate of FIG. 1.

The heat correction gate 259 (FIG. 6) comprises a pair of transistors 63Q and 64Q. In the preferred embodiment shown, the heat correction gate 259 is essentially similar to the composite gate comprising the plus gate 267 and minus gate 268. More particularly, transistors 63Q and 64Q are connected in inverse parallel array between lines 258 and 238 for conduction in opposite directions. The transistor 63Q thus has its emitter connected directly to the output line 238 and its collector connected through a protective diode 418 to the input line 258. Similarly, the emitter of transistor 64Q connects to the input line 258 and the collector thereof connects to the output line 238 through a protective diode 419. The diodes 418 and 419 ore oriented to prevent reverse conduction through the transistors in series therewith. The bases and emitters of transistors 63Q and 64Q are coupled by respective bias resistors 421 and 422. Drive is supplied to the bases of transistors 63Q and 64Q from the output line 281 of the peak R detector 271, in the first case through series resistor 423 and protective diode 424 and in the second through a further series resistor 426 and diode 427. The diodes 424 and 427 are oriented to apply positive voltages to the bases of transistors 63Q and 64Q and to isolate the line 281 when at a low potential from high potentials which might appear in the gate 259. The output line 238 of the heat correction gate 259 is coupled to the common line 63 through a suitable resistor 428. Thus, when positive drive is applied by the peak R detector through line 281 to the bases of the transistors 63Q and 64Q, said transistors conduct, the transistor 63Q conducting when the line 258 is positive with respect to the output line 238 and the transistor 64Q conducting when the line 258 is negative with respect to the output line 238. Removal of positive drive from the line 281 renders both transistors nonconductive and isolates the input line 258 from the output line 238.

OPERATION

Although the operation of the system has been indicated above to some extent, same will now be considered in detail to assure a complete understanding of the invention. In considering the operation of the feedback control 210 and more particularly, the operation of the heat correction control 230, attention will first be directed to the output portion 234 thereof to illustrate the type of heat correction signal that will adjust the welding heat in a manner that the contact resistance will follow a predetermined function during fusion. Thereafter, the operation of the heat correcting portion 251 of the heat correction control 230 will be described to illustrate how the required heat correction signal is produced.

The heat control reference 243 (FIGS. 1 and 2) is set prior to welding by adjusting the wiper of potentiometer 291 to provide a negative D.C. heat control reference signal which is proportional in amplitude to the desired welding heat. The heat control signal from the heat control reference 243 is summed with the heat correction signal, if any, from the line 238 and this sum is applied to the heat control amplifier 236. The negative feedback loop 242 maintains the gain of the amplifier 236 at a preselected level, for example, unity.

In view of the very high gain, e.g., $10^4$ or more, of the operational heat control amplifier, its input current is negligible even for high current outputs. Thus, the current flow through summing junction 237a may be attributed to the flow through the input summing resistors 294 and 299 and negative feedback summing resistor 296. Where the summing resistors are all equal, gain will be unity and the feedback voltage will be opposite in polarity and equal in magnitude to the sum of the reference heat signal and heat correction signal. If desired, the effect of the heat correction signal can be changed, for example, lessened in proportion to that of the heat reference signal as by reducing the value of the heat reference summing resistors 294 below that of the heat correction summing resistor 299.

The heat correction signal may be positive or negative depending upon the direction of deviation of the instantaneous welding resistance from the value, prescribed for it at any given time by the desired resistance function which it is to follow. For example, an increase in the resistance signal R above the magnitude of the reference R signal during fusion would swing the heat correction signal negatively and when added to the negative polarity heat reference signal at the heat control amplifier input, a greater positive output therefrom would result. A decrease in the resistance signal R would have the opposite effect.

Thus, the input to the heat control amplifier 236 is first buffered through the cascaded transistor pair 54Q, 55Q and appears across emitter resistor 303. Transistor 56Q, regulated by transistor 57Q, uniformly shifts the signal in a positive direction by causing it to appear on the collector thereof. The sum signal is amplified and phase inverted by the transistor 58Q and appears on the emitters of the complementary symmetry pair 59Q, 60Q. This output signal, inverted in phase from the sum input to the heat control amplifier is applied as negative feedback to the summing resistor 296 and, also is applied through line 231 and resistor 323 to the input of the phase control 232.

In the preferred form of phase control 232 disclosed, the output of the heat control amplifier 236 is applied to the base of transistor 61Q, positive going amplifier outputs increasing the conductivity of said transistor and negative going signals decreasing the conductivity thereof. The bridge rectifier 328 coupled across the transistor 61Q is intended to stand in the place of the conventional heat control potentiometer, not shown, normally found in conventional heat controls for selecting the phase point of weld current initiation by correspondingly increasing or decreasing the resistance across an A.C. source S.

Thus, where the weld heat applied to the workpiece is insufficient to make the contact resistance drop fast enough to follow the desired function, a negative going potential appears at the output 238 of the heat correction gate and is added to the negative heat control reference signal. The sum is applied to the input of the heat control amplifier which supplies the inverted sum, which is thus positive and positive going, to the phase control transistor 61Q driving same more conductive to lower the effective resistance across the output lines 331 and 332. This diminution in resistance can be readily caused by any suitable, conventional heat control circuitry desired to initiate weld current flow earlier in each half cycle to provide the necessary additional heat. Diminution of heat is similarly achieved in response to too rapid a decline in contact resistance.

Under certain conditions, it may be desirable to add to the above-described closed loop resistance control, a further closed loop control specifically for compensating spurious welding electrode voltage variations which would be reflected in unwanted weld current amplitude changes.

Although variations in weld current will vary the contact resistance drop rate and therefore would be detected by the heat correction portion 251, somewhat more rapid and exact correction could be made by direct monitoring and correction of the varying electrode voltage. Such would also leave the heat correction portion 251 more free to operate on other variations in contact resistance. Such closed loop control of heat changes due to electrode voltage variations is here effected by switching the switch 239 of FIG. 1 to its automatic position whereby disconnecting the fixed heat control reference signal in its place is provided the sum of the negative fixed peak E reference voltage which selects the preferred electrode voltage to be used and the electrode voltage feedback signal from line 249 which is directly proportional to electrode voltage magnitude. Since these two signals are opposite, a decrease in electrode voltage causes the peak E reference signal to swing more negative. This results in a positive going input to transistor 61Q, a decrease in resistance across lines 331 and 332 and thus an increase in weld heat to correct for the drop in electrode voltage.

Figure 4:
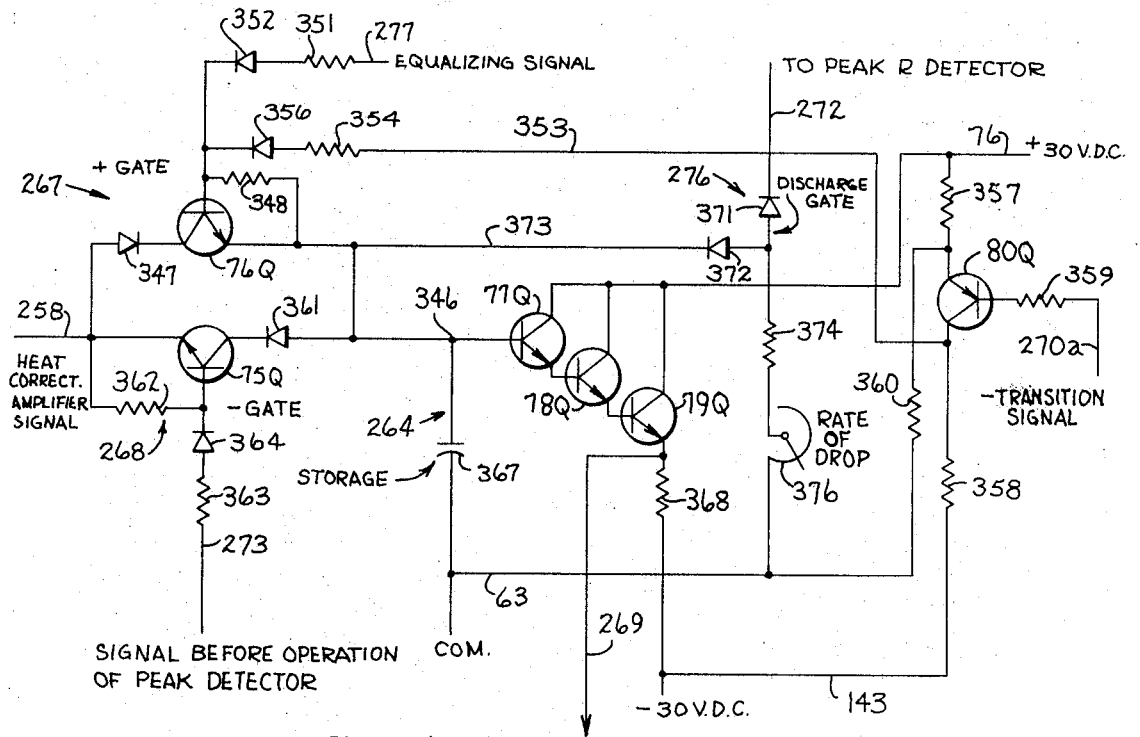
FIG. 4 is a schematic diagram relating to the plus and minus gates, storage circuit, discharge gate and rate of drop control used in the circuit of FIG. 1.
Figure 5:
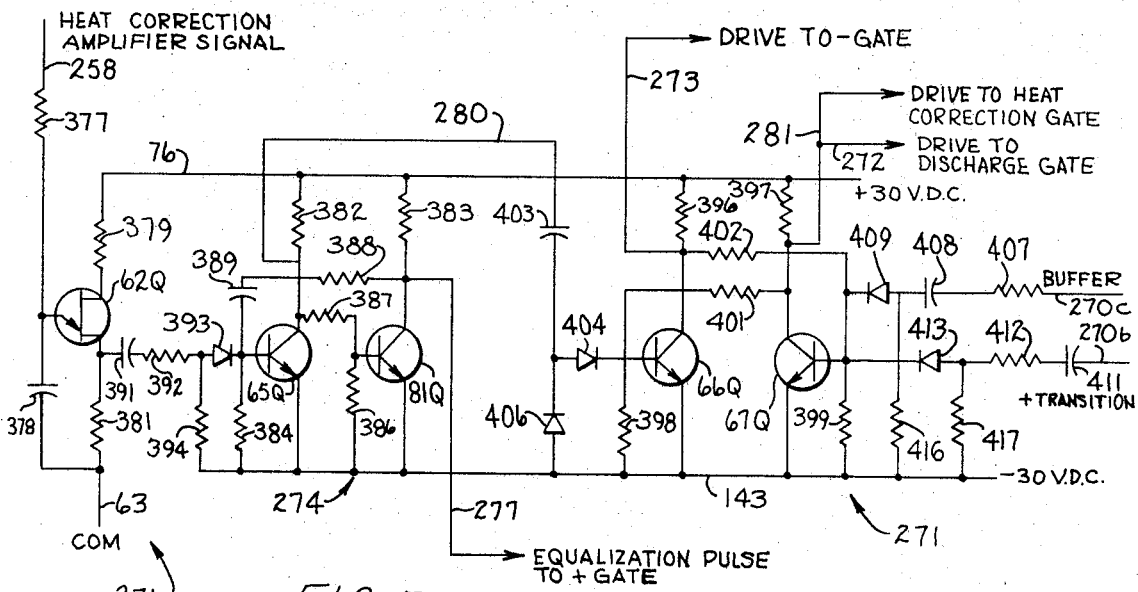
FIG. 5 is a schematic diagram disclosing the peak R detector and equalizing one-shot circuits of FIG. 1.

Turning now to the heat correction portion 251 of the heat correction control 230, the line 214 couples the resistance signal R, which is proportional to the instantaneous weld contact resistance, from the R circuit 212 through the summing resistor 254 to the summing junction 253 at the input of the heat correction amplifier 252. The signal R is, in the particular embodiment shown, zero until the weld interval starts and thereafter assumes positive magnitudes generally as indicated in FIG. 7B. The output of the heat correction amplifier 252 in the initial portion of the weld interval, i.e., during the transition time, is the resistance signal R inverted in polarity and such is applied to the heat correction gate 259 which is then nonconductive. The internal operation of this amplifier is similar to that of the heat correction amplifier and hence needs no further description. Since the heat correction gate 259 is nonconductive, there is no feedback through line 261 and summing resistor 257 to the input of the heat correction amplifier. The output of the heat correction amplifier 252 also is applied by line 258 to the input end of the plus gate 267 and the minus gate 268. The gates 267 and 268, when conductive, impress the inverted resistance signal R comprising the output of the heat correction amplifier onto the storage circuit 264. More particularly, the plus gate 267 is maintained conductive during the transition time, as a result of being driven through the line 353, resistance 354 and diode 356, by the normal conduction of drive transistor 80Q (FIG. 4). The minus gate 268 is held conductive during the transition time and somewhat therebeyond by the positive input (FIG. 7H) thereto through the line 273, resistor 363 and diode 364 from the collector of transistor 66Q in the peak R detector flip flop 66Q, 67Q (FIG. 5). When conductive, the plus gate 267 is capable of passing positive going potentials to the storage circuit 264 while the minus gate 268 passes negative going potential thereto. A drop in the resistance signal R causes an inverse R signal at the output of the correction amplifier 252 to be less negative and this positive going change will be impressed through the plus gate 267 on the storage circuit 264. On the other hand, should the reference R signal increase so that the output of the heat correction amplifier 252 decreases, this decrease will be impressed by the negative gate 268 on the storage circuit.

The inverted resistance signal R conducted through plus and minus gates 267 and 268 charges the storage capacitor 367 (FIG. 4). During this initial portion of the weld interval, the discharge gate 276 is held inoperative by the low potential applied to line 272 by the normally conductive transistor 67Q (FIG. 5) of the peak R detector 271. The potential thus stored on the storage capacitor 367 is buffered out by the buffer circuit 77Q, 78Q and 79Q, applied across the emitter resistor 368 and, through line 269, and applied as the reference R signal back through the feedback reference R feedback loop 263 including the summing resistor 256 (FIG. 3) to the input of the heat correction amplifier 252.

Thus, since the reference R signal so applied is opposite in polarity but otherwise follows the waveform of the reference signal R, the reference signal R limits the otherwise high gain of the amplifier 252 so that its output, the inverse R signal, is maintained much smaller, during the initial portion of the weld interval, then it would otherwise be. More particularly, the reference R signal is preferably maintained essentially equal to the R signal so that the amplifier gain is held at unity and the inverse R signal output is equal in magnitude to the resistance signal R.

At the end of the transition time, the drive to the plus gate 267 is removed. This is accomplished by the application of the minus transition signal (FIG. 7E), which is a positive potential originating at the end transition time and continuing until the end of the weld interval, through the line 270a and resistance 359 to the base of normally conductive transistor 80Q. This positive potential terminates conduction through the PNP transistor 80Q as a result of which the collector potential thereof drops essentially to that of the minus potential line 143 and terminates drive through the line 353 to the plus gate 267. With only the minus gate 268 thus conductive after the transition time, only negative going potentials from the output of the amplifier 252, corresponding to increases in the resistance signal R, will be impressed on the storage circuit 264. Decreases in the resistance signal R, corresponding to positive going potentials at the output with the heat correction amplifier, are blocked by nonconduction of plus gate 267 and therefore cannot change the charge on capacitor 367. Thus, immediately after transition time, the storage circuit 264 in effect responds only to increases in the resistance signal R. However, as long as the resistance signal R continues to rise or remain fixed, the reference R signal stored and fed back will continue to limit the gain of the heat correction amplifier 252 and maintain its output negative as before.

As the weld interval progresses, the welding contact resistance and the resistance signal R continue to rise until a peak value is reached. The peak may be relatively broad and the resistance value may change little over several cycles of weld current, even after the peak contact resistance signal R drops gradually. The peak indicates the beginning of fusion and the drop continues during the fusion. When the peak is reached and the resistance signal R fails to rise further, current flow through the minus gate 268 ceases since the output of the amplifier is rising rather than falling (FIG. 7K). The rise of the amplifier output, corresponding to the gradual fall in the resistance signal R from its peak, therefore cannot produce a rise in the reference R signal stored since the plus gate 267 is nonconductive for lack of drive and the minus gate cannot conduct the rising potential. The now fixed reference R potential stored on capacitor 367 is applied by the buffer 77Q, 78Q, 79Q through the line 269 to the input of heat correction amplifier 252. However, while this reference R signal remains at a fixed negative value, the resistance signal R is dropping in positive value. As a result, the sum of these signals is no longer a small positive value but rather swings negative and increases in magnitude. Also, since there is now no closed loop around the amplifier (due to the plus and minus gates being nonconductive) the system gain increases to the open loop gain of the amplifier, e.g., $10^4$ or more. The output of the heat correction amplifier 252 swings extremely positive and increases at a rate determined by the rate of drop of the contact resistance. This resulting large positive output cannot reach the storage capacitor 367 since the plus gate is not driven.

On the other hand, this large and increasing positive signal is applied to the peak R detector 271 and, more particularly, through resistor 377 (FIG. 5) to the capacitor 378 and emitter of unijunction 62Q. After a short but nonzero time, the amplifier output raises the emitter potential of unijunction 62Q enough to fire same. The RC combination of resistor 377 and series capacitor 378 is preferably chosen to render said unijunction 62Q insensitive to rapid positive transient potentials appearing on the line 258 due to electrical or other noise in the system. Actuation of the peak R detector and hence output therefrom, necessarily lags behind maximization of the contact resistance. This lag corresponds to the time interval L shown in FIG. 8. However, it will be noted that this lag time is but a small fraction of the normal time required for complete fusion.

Firing of the unijunction 62Q impresses a positive pulse through capacitor 391, resistor 392 and diode 393 onto the base of transistor 65Q of the equalizing one-shot circuit 274. This causes the normally nonconductive transistor 65Q to conduct and the resulting drop in its collector potential is applied through the line 280 and coupling capacitor 403 to the peak R flip flop 66Q, 67Q, as hereinafter discussed, as well as to the base of transistor 81Q. The transistor 81Q thus falls nonconductive and its collector potential rises. This collector potential rise is coupled through resistor 388 and capacitor 389 as a short positive pulse to the base of transistor 65Q for maintaining same conductive for a short interval following the firing of the unijunction 62Q. The transistor 65Q remains conductive only until the capacitor 389 charges at which time the one-shot circuit 274 returns to its original state with the transistor 65Q falling nonconductive and transistor 81Q thus becoming conductive.

The afore-mentioned momentary high potential on the collector of the transistor 81Q is coupled as a positive pulse through line 277, resistor 351 (FIG. 4) and diode 352 to the base of the plus gate transistor 76Q momentarily rendering same conductive and marking the end of the afore-mentioned lag period L. As a result, the plus gate 267 applies the high positive output of the heat correction amplifier 252 to the capacitor 367 causing same to discharge toward a less negative value and so decreasing the magnitude of the reference R signal as indicated by the arrow ΔM in FIG. 8. The feedback loop 263 is thus again closed and the negative reference R signal stabilizes at a value which when summed with the positive resistance signal R provides the small positive sum signal input to the amplifier 252 required for an output equal to the inverse of the signal R. Thus, the circuit is returned momentarily to the stable feedback operation occurring during the transition time with the storage circuit updated so that its output reference R signal is again made essentially equal in magnitude to the resistance signal R at the reduced value of the latter at the end of the time L after the occurrence of the resistance peak. The gradual drop in magnitude of the resistance signal R from the peak during the lag time L is indicated by the broken line path F in FIG. 8.

It will be noted that if after the lag L, the plus and minus gates were not made conductive to readjust the stored reference value, there would at the end of such time L be the disparity ΔM between the old peak value stored on the capacitor 367 and the resistance signal R. If such disparity ΔM were not corrected, the system would err in seeing the weld contact resistance as being too low. Consequently, the heat applied to the workpiece would be reduced in an effort to reduce the rate of drop of the contact resistance until it met the point on the desired function curve which it would thereafter follow. However, such a correction would be an erroneous one and would improperly reduce the weld current for the time required to make the erroneous correction and there would be in every weld a period after the lag time L in which less than normal heat was applied to the weld.

The equalization of the reference R signal and resistance signal R magnitudes during the equalization time eliminates this initial error by starting the reference R signal along its desired decreasing magnitude only after it has been adjusted to the contemporary resistance signal magnitude.

Termination of the equalization pulse terminates drive to the plus gate 267 rendering same again nonconductive. At the end of the equalization pulse, the collector potential of transistor 65Q rises, such rise being coupled as a positive pulse through line 280, capacitor 403 and diode 404 to the base of flip-flop transistor 66Q for rendering same conductive. Conduction of transistor 66Q drops the collector potential thereon and thereby terminates the drive to the minus gate transistor 75Q. Thus, conduction of the plus gate 267 and minus gate 268 ceases at the end of equalization pulse and the value stored on capacitor 367 no longer follows the resistance signal R.

Conduction of the transistor 66Q also renders normally conductive transistor 67Q nonconductive. As the result, the collector of transistor 67Q assumes a high potential which is applied through line 272 to drive the discharge gate and through line 281 to drive the heat correction gate.

More particularly, the line 272 now provides a positive potential to the cathode of discharge gate diode 371 (FIG. 4) blocking same. As a result, the former low potential is removed from the anode of diode 372 unblocking same and allowing the diode 372 to conduct the discharge of the negatively charged storage capacitor 367 gradually through line 373, a resistor 374 and the rate of drop potentiometer 376. The rate of drop potentiometer 376 is set to discharge of the capacitor 367 at a preselected rate corresponding to the rate at which the resistance signal R and more particularly the weld contact resistance is desired to drop during fusion. Thus, as fusion progresses the reference R signal applied to the input of the amplifier 252 diminishes in magnitude (becomes less negative) at a constant rate set by the rate of drop potentiometer 276. If the resistance signal R should drop more slowly in magnitude than the reference R signal, the output of the heat correction amplifier will swing negative, whereas if the reference resistance signal R drops more rapidly than is desired the output of the heat correction amplifier will swing positive.

Returning in time to the end of the equalization time it will be recalled that drive is supplied to the heat correction gate simultaneously with de-energization of the plus and minus gates 267 and 268 and with application of drive to the discharge gate. The heat correction gate 259 thus has a steady positive potential applied thereto by the line 281 and through the diode resistance sets 423, 424 and 426, 427 to the bases of transistors 63Q and 64Q rendering same conductive. Thus positive swings in the output of the heat correction amplifier will be applied through the transistor 63Q to the line 238 and negative swings will be applied through transistor 64Q thereto. The output on line 238 is fed back through the feedback loop 260, and more particularly through line 261 and summing resistor 257, to the input of the heat correction amplifier to limit the gain thereof to any desired value when the feedback loop 263 through the plus and minus gates 267 and 268 opens. The heat correction signal on line 238 then, as above described, is summed with the appropriate reference signal to control the heat applied to the workpiece in a manner to cause the welding resistance to follow the desired resistance function as determined by the setting of the rate of drop potentiometer 376 (FIG. 4).

The embodiments of the invention in which an exclusive property or privilege is claimed are defined as follows:

1. In a resistance drop feedback weld control, circuitry for causing the weld contact resistance to follow a predetermined resistance function during fusion, comprising in combination:
   means for providing a reference signal;
   means responsive to rises in the magnitude of said weld contact resistance prior to fusion for causing said reference signal to follow rises in said contact resistance;
   means responsive to a preselected drop in said contact resistance from its peak value to a reduced value for correcting said reference signal to correspond to said reduced value;
   means responsive to said drop for causing said reference signal thereafter to follow a preselected decreasing function of time;
   means responsive to differences between said contact resistance and said reference signal, as said reference signal follows said decreasing function, for varying the weld heat in a manner to reduce such differences.

2. In a resistance drop weld control, circuitry for causing the weld contact resistance to follow a preselected decreasing function during fusion, comprising in combination:
   an amplifier having an input and an output;
   means applying a resistance signal to the input of said amplifier proportional to the weld contact resistance so that said amplifier output follows said resistance signal;
   storage means and gate means connected in series in a first inverse feedback loop around said amplifier for limiting the gain thereof when closed, said gate means being disposed between said output of said amplifier and said storage means for controlling updating of said storage means by said amplifier output;
   means maintaining said gate means conductive during the initial portion of the weld interval for causing said storage means to follow said resistance signal and limit the gain of said amplifier;
   means responsive to the termination of said initial portion of the weld interval for preventing said storage circuit from following the drop in said weld contact resistance occurring at the start of weld fusion whereby said amplifier output increases;
   a detector connected to said amplifier output and energizable by an increased amplifier output for momentarily returning said gate means to full conduction from said amplifier output to said storage means for causing same to correspond to the dropped contact resistance;
   means responsive to energization of said detector for gradually discharging said storage circuit in accordance with said preselected decreasing function which said weld contact resistance is to follow;
   a second inverse feedback loop connected around said amplifier and including a normally nonconductive output gate normally maintaining said second loop open;
   further means responsive to energization of said detector for rendering said output gate conductive and concurrently terminating conduction through said gate means in said first reverse feedback loop, conduction through said output gate closing said second feedback loop to limit the gain of said amplifier;
   means responsive to conduction through said output gate for controlling the welding heat to minimize the deviation of the weld contact resistance from the desired function which it is to follow during fusion.

3. In a resistance feedback weld control the combination comprising:
   means generating a signal proportional to the weld contact resistance;
   means timing a predetermined maximum weld interval;
   means fed by said generating means for sensing the occurence of the peak value of the weld contact resistance corresponding to the start of weld fusion;

delay means coupled to said peak sensing means and responsive to the initiation of said weld interval for preventing operation of said peak sensing means during the initial unstable resistance portion of the weld interval;

means responsive to operation of said peak sensing means for constraining the weld contact resistance to follow a preselected decreasing function after said resistance peak has occurred;

means for causing said timing means to terminate the weld interval in response to a drop in weld contact resistance to a preselected fraction of its peak value.

4. In a feedback resistance drop welding control, a heat correction control circuit, comprising the combination:

a phase-inverting operational amplifier having an input and an output, said amplifier having high open loop gain and means applying a resistance signal to the input thereof proportional to the weld contact resistance;

a first negative feedback loop connected from the output of said amplifier to the input thereof, said feedback loop including a storage circuit connected to the amplifier input for applying a reference signal thereto and a parallel connected and oppositely conductive pair of gates connected in series between said storage circuit and the output of said operational amplifier;

means normally rendering said gates conductive for closing said first loop to limit the gain of said amplifier to a preselected value, by causing said reference signal to be proportional to said resistance signal;

timing means rendering one of said gates responsive to decreases in said resistance signal inoperative at a preselected point in the weld interval so that the reference signal cannot follow such a resistance signal drop whereby said output of said amplifier increases rapidly in response to a slow drop in said weld contact resistance;

a detector responsive to a substantial increase in output from said amplifier, said detector having associated therewith equalization means for momentarily rendering the nonconductive one of said gates momentarily conductive to render the reference signal inversely proportional to the dropped resistance signal;

further means in said detector circuit responsive to the termination of said momentary energization of said one gate for deenergizing the other of said gates;

a dischage gate operable in response to the output of said further means and a rate of drop control connected thereby, upon energization thereof, to said storage circuit for reducing said reference signal in accordance with a preselected decreasing function which it is desired that the resistance signal follow;

a second negative feedback loop connected around said amplifier and a heat correction gate in said second feedback loop, said heat correction gate normally being nonconductive for maintaining said second loop open and means connecting said heat correction gate to said further means of said detector for rendering said heat correction gate conductive in response to an output from said further means so that said second feedback loop is completed around said amplifier as said first feedback loop is opened;

means responsive to the output of said heat correction gate for varying the welding heat in a manner to minimize the output of said amplifier and hence to cause the welding contact resistance to fall in accordance with said preselected function.

5. The device defined in claim 4 in which said parallel gates comprise first and second inverse parallel connected transistors, each connected between the output of said amplifier and the input of said storage circuit, said first transistor being capable of conduction to said storage circuit when the output of said amplifier is positive with respect thereto and means connecting the base of said first transistor to said equalizing means for energization thereby;

a potential source and a normally conductive switch connecting said potential source to said base of said first transistor for maintaining same conductive;

said timing means rendering said switch nonconductive after the initial portion of said weld interval;

means connected to the base of said second transistor from said detector circuit and responsive to the unenergized condition of said detector for rendering said second gate transistor conductive.

6. The device defined in claim 4 in which said storage circuit comprises a storage capacitor connected to the input of said storage circuit;

buffer means connected between the input and output of said storage circuit for providing the charge on said storage capacitor to the input of said operational amplifier;

means connecting said discharge gate and said rate of drop circuit across said storage capacitor, said rate of drop circuit comprising a manually adjustable potentiometer in series with said capacitor for determining the rate of discharge thereof, said discharge gate comprising a first diode in series between said potentiometer and said capacitor, said first diode having its cathode oriented toward said capacitor for conducting negative potentials theerfrom, said discharge gate further including a second diode connected anode to anode with said first diode and thence to said detector circuit;

means in said detector circuit for normally imposing a low potential on said second diode for rendering same conductive through said potentiometer and for blocking said first diode and said means being responsive to energization of said detector for raising the potential applied to said second diode for unblocking said first diode to allow discharge of said capacitor therethrough at a rate determined by the setting of said potentiometer.

7. The device defined in claim 4 in which said detector circuit comprises a unijunction transistor and an RC charging circuit connected to the emitter thereof responsive to a preselected positive potential at the output of said amplifier for firing said unijunction transistor;

said equalizing means comprises a one-shot multivibrator responsive to firing of said unijunction transistor for providing an equalization pulse and means coupling said equalization pulse to said parallel connected gate circuitry for causing same to reduce the value stored in said storage circuit;

said further portion of said detector circuit comprising a flip-flop circuit, said flip-flop having a pair of input terminals and a pair of output terminals, means coupling said one shot circuit to one input of said flip-flop for shifting same from its rest condition on termination of said equalization pulse, providing the other of said input terminals with energizing signals at the beginning of the weld interval, one output terminal being energized in response to energization of said one input terminal and means connecting said one output termial to said heat correction gate and discharge gate for driving same, said second output terminal being connected to said parallel gate pair.

8. The device defined in claim 4 in which said heat correction gate comprises first and second transistors connected in inverse parallel relation between the input and output terminals of said heat correction gate;

protective diodes in series with said transistors and connected to the collector terminals thereof;

biasing resistors connecting between the base and the emitter terminals thereof; and means connecting the bases of said transistors to said detector for energization thereby, said means including isolating diodes oriented to pass conductive bias to said transistors.

9. A method for constraining the weld contact resistance to follow a predetermined decreasing function during weld fusion, comprising the steps:
- generating a reference signal which follows said weld contact resistance as it moves toward a peak value prior to fusion;
- preventing said reference signal from following when said weld contact resistance falls from its peak value at the beginning of the fusion;
- sensing a preselected disparity between said weld contact resistance and reference signal, indicating that the weld contact resistance has fallen in order to determine that the peak value of the weld contact resistance has occurred;
- thereafter adjusting the reference signal to momentarily correspond to the fallen weld contact resistance;
- thereafter causing said adjusted reference signal to follow said desired function;
- concurrently varying the weld heat to cause said weld contact resistance to follow said reference signal;
- whereby said weld contact resistance is constrained to follow said predetermined function as represented by said decreasing reference signal.

References Cited

UNITED STATES PATENTS 2,848,595   8/1958   Van Sciver _____ 219—110 X

RALPH F. STAUBLY, Primary Examiner